S. LANE, Jr.
Pump.
No. 133,373.            Patented Nov. 26, 1872.
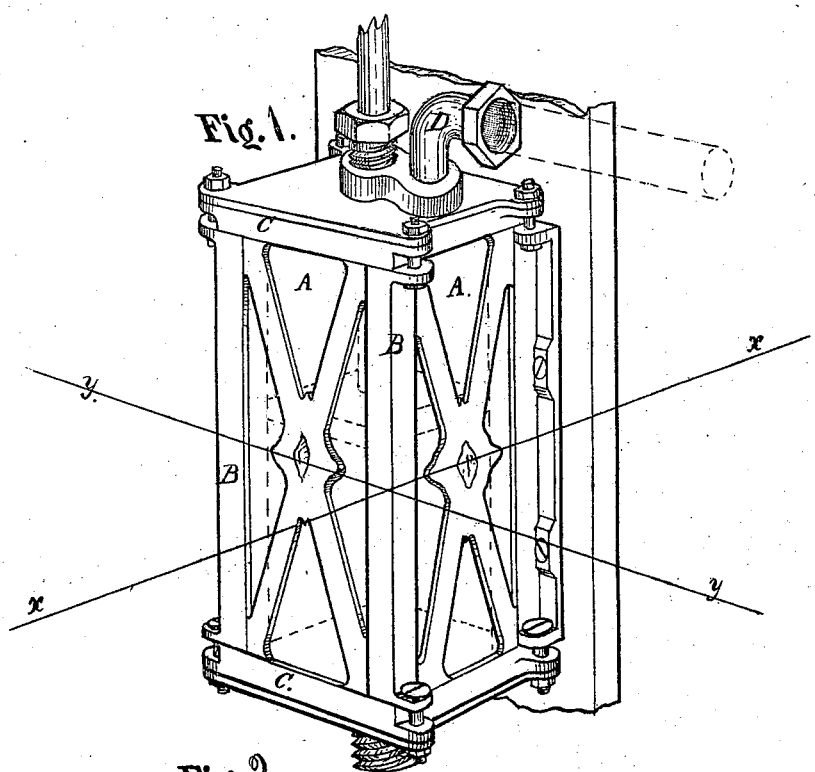
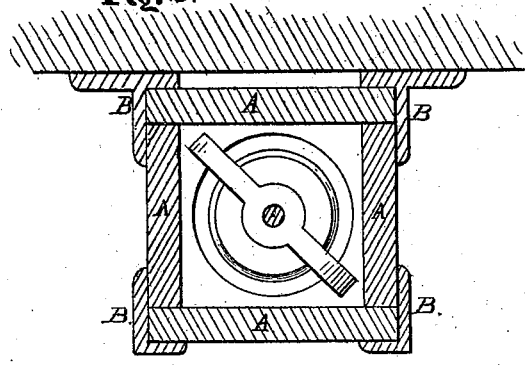
Witnesses.
J. P. Crawford
E. P. Woods
Inventor.
Stephen Lane Jr.
Atty.

UNITED STATES PATENT OFFICE.

STEPHEN LANE, JR., OF ENGLEWOOD, NEW JERSEY.

IMPROVEMENT IN PUMPS.

Specification forming part of Letters Patent No. 133,373, dated November 26, 1872.

*To all whom it may concern:*

Be it known that I, STEPHEN LANE, Jr., of Englewood, in the county of Bergen and State of New Jersey, have invented an Improved Pump, of which the following is a specification:

Nature and Objects of the Invention.

My invention relates to pumps used for drawing ale, beer, and other fermented or aciduous liquors, and for other purposes; and my invention consists in a novel method of constructing said pump; and has for its objects to deliver the liquor pumped through it in a pure state, as will be fully set forth hereafter.

Description of the Drawing.

Figure 1 is a perspective view of my improved pump. Fig. 2 is a sectional view through the plane $x\,x\,y\,y$, Fig. 1.

General Description.

A represents sectional plates of glass, which are cemented and clamped together by means of the grooved bars B and heads C, so that they shall be air-tight. The heads C are provided with the ordinary apparatus for pumping—namely, a screw-connection with the liquid vessel, and a packing arrangement for the pump-rod, and a discharge-pipe, D, as plainly shown in the drawing. In the construction of my pump I take plates or strips of glass of proper thickness, the faces and edges of which are made perfectly even and true, and clamp them together in cement by means of the bars B and plates and screws, so that they will be and remain perfectly tight. The valves, rod, and packing arrangement are the same as in other incorrodible pumps, which form no part of my invention.

I am aware that glass cylinders have been used, or attempted to be used for pumps, and the following are among the reasons why they are not generally used: All ordinary glass cylinders are cast or blown in molds, and in such case there must be difference enough in the diameter of the ends of the cylinder, so that they can be withdrawn from the mold. The cylinder is thus of unequal diameter throughout its length, and the valve and plunger can only be made to work by an expanding packing on the plunger, which will compensate for the varying diameter of the cylinder. The pump will thus work hard, resulting from the friction of the packing upon the cylinder, and will soon get out of repair.

These difficulties I obviate, as I make a perfect and equal caliber throughout the pump-cylinder. In the drawing the pump is represented as square, but I intend to make them in octagonal form or other shapes, as will aid to adapt them generally to all purposes.

I claim—

As a new and improved article of manufacture, a pump made of sectional plates of glass, cemented and clamped together, substantially in the manner described and set forth.

STEPHEN LANE, JR.

Witnesses:
C. A. DURGIN,
J. P. CRAWFORD.